(12) United States Patent
Farr, Jr.

(10) Patent No.: US 8,910,415 B2
(45) Date of Patent: Dec. 16, 2014

(54) FISHING LURE WITH MOVABLE PARTS

(76) Inventor: Jack Anthony Farr, Jr., Humble, TX (US)

( * ) Notice: Subject to any disclaimer, the term of this patent is extended or adjusted under 35 U.S.C. 154(b) by 491 days.

(21) Appl. No.: 13/247,837

(22) Filed: Sep. 28, 2011

(65) Prior Publication Data

US 2013/0074395 A1   Mar. 28, 2013

Related U.S. Application Data

(60) Provisional application No. 61/386,686, filed on Sep. 27, 2010.

(51) Int. Cl.
*A01K 85/01*   (2006.01)
*A01K 85/00*   (2006.01)

(52) U.S. Cl.
CPC .............. *A01K 85/00* (2013.01); *A01K 85/01* (2013.01)
USPC ....... 43/42.28; 43/42.06; 43/42.31; 43/42.32; 43/42.36; 43/42.39

(58) Field of Classification Search
USPC ............ 43/42.28, 42.31, 42.39, 42.36, 42.32, 43/42.06, 42.09
See application file for complete search history.

(56) References Cited

U.S. PATENT DOCUMENTS

| | | | | |
|---|---|---|---|---|
| 1,723,557 A | * | 8/1929 | Ono | 43/42.28 |
| 2,161,094 A | * | 6/1939 | Saunders, Jr. | 43/42.28 |
| 2,167,334 A | * | 7/1939 | Hayes | 43/42.06 |
| 2,183,816 A | * | 12/1939 | Lovelace | 43/42.06 |
| 2,517,495 A | * | 8/1950 | Kneece | 43/42.06 |
| 2,617,226 A | * | 11/1952 | Tadaichi | 43/42.28 |
| 2,625,767 A | * | 1/1953 | Pokras | 43/42.36 |
| 2,912,783 A | * | 11/1959 | Marks | 43/42.28 |
| 3,497,987 A | * | 3/1970 | Perrin | 43/42.28 |
| 3,708,903 A | | 1/1973 | Bercz et al. | |
| 3,855,722 A | * | 12/1974 | Moore | 43/42.28 |
| 3,908,298 A | * | 9/1975 | Strader | 43/42.31 |
| 3,913,257 A | * | 10/1975 | Colgan | 43/42.09 |
| 3,947,989 A | * | 4/1976 | Bart | 43/42.28 |
| 3,955,304 A | * | 5/1976 | Reid | 43/42.28 |
| 4,033,063 A | * | 7/1977 | Mize | 43/42.06 |
| 4,038,773 A | | 8/1977 | Castelletti | |
| 4,054,004 A | * | 10/1977 | Schott | 43/42.09 |
| 4,199,888 A | * | 4/1980 | Barnes | 43/42.39 |
| 4,203,246 A | | 5/1980 | Sacharnoski, Sr. | |
| 4,215,506 A | * | 8/1980 | LeBoeuf | 43/42.28 |
| 4,337,591 A | * | 7/1982 | Gell et al. | 43/42.39 |
| 4,520,588 A | * | 6/1985 | Hindermyer | 43/42.06 |
| 4,630,389 A | * | 12/1986 | Higgins | 43/42.33 |
| 4,747,228 A | | 5/1988 | Giovengo | |
| 4,777,757 A | * | 10/1988 | de Marees van Swinderen | 43/42.06 |
| 4,803,793 A | | 2/1989 | Schellenberg | |
| 4,831,768 A | * | 5/1989 | Sorace | 43/42.09 |
| 5,018,297 A | * | 5/1991 | Kennedy, Jr. | 43/42.28 |
| 5,020,266 A | * | 6/1991 | Williamson | 43/42.39 |
| 5,097,620 A | * | 3/1992 | Nietupski | 43/42.06 |
| 5,113,607 A | * | 5/1992 | Pate | 43/42.28 |
| 5,121,568 A | | 6/1992 | Lindmeyer | |
| 5,142,811 A | * | 9/1992 | Freeman | 43/42.06 |
| 5,144,765 A | * | 9/1992 | Keeton | 43/42.31 |

(Continued)

*Primary Examiner* — Darren W Ark
(74) *Attorney, Agent, or Firm* — William C. Yarbrough, III

(57) ABSTRACT

A fishing lure includes a lure head, a leader within a leader tube within the lure head; a ball rattler within the lure head; and an aerator cap attached to a front side of the lure head.

14 Claims, 1 Drawing Sheet

(56) References Cited

U.S. PATENT DOCUMENTS

| | | | | |
|---|---|---|---|---|
| 5,167,089 A * | 12/1992 | Schriefer | | 43/42.36 |
| 5,172,510 A * | 12/1992 | Lovell, Jr. | | 43/42.36 |
| 5,207,016 A * | 5/1993 | Pate | | 43/42.28 |
| 5,259,151 A * | 11/1993 | Wicht | | 43/42.31 |
| 5,261,181 A * | 11/1993 | Melton | | 43/42.06 |
| 5,299,378 A * | 4/1994 | Ballard | | 43/42.06 |
| 5,361,531 A * | 11/1994 | Rodrigues | | 43/42.09 |
| 5,428,917 A | 7/1995 | Cunningham | | |
| 5,428,919 A * | 7/1995 | Enomoto | | 43/42.31 |
| 5,497,581 A | 3/1996 | Williams | | |
| 5,524,379 A | 6/1996 | Hood | | |
| 5,546,694 A | 8/1996 | Wilkinson | | |
| 5,586,405 A | 12/1996 | Fike | | |
| 5,596,831 A * | 1/1997 | McWethy, Jr. | | 43/42.36 |
| 5,598,659 A * | 2/1997 | Vanorden | | 43/42.39 |
| 5,617,667 A * | 4/1997 | Gonzalez | | 43/42.36 |
| 5,647,163 A | 7/1997 | Gorney | | |
| 5,893,231 A | 4/1999 | Kato | | |
| 5,996,271 A | 12/1999 | Packer | | |
| 6,061,948 A * | 5/2000 | Boucek | | 43/42.09 |
| 6,082,038 A | 7/2000 | Link | | |
| 6,094,855 A | 8/2000 | Stump | | |
| 6,112,451 A | 9/2000 | Webb | | |
| 6,176,035 B1 | 1/2001 | Somogyi | | |
| 6,212,818 B1 | 4/2001 | Huddleston | | |
| 6,286,246 B1 | 9/2001 | Rachal | | |
| 6,357,167 B1 * | 3/2002 | Bradford | | 43/42.09 |
| 6,510,646 B1 * | 1/2003 | Kechriotis | | 43/42.31 |
| 6,643,975 B1 | 11/2003 | Edwards | | |
| 6,796,079 B1 | 9/2004 | McCain | | |
| 6,880,287 B2 | 4/2005 | Eubanks | | |
| 7,383,659 B1 | 6/2008 | Honkanen | | |
| 7,493,725 B2 | 2/2009 | Sampson | | |
| 7,530,194 B1 | 5/2009 | Wrape | | |
| 7,562,489 B2 * | 7/2009 | Turner | | 43/42.06 |
| 7,621,068 B1 | 11/2009 | Renosky | | |
| 7,827,730 B1 | 11/2010 | Jensen | | |
| 8,079,173 B2 * | 12/2011 | Corbitt, III | | 43/42.36 |
| 8,091,271 B2 * | 1/2012 | Mayer | | 43/42.32 |
| 8,381,429 B2 * | 2/2013 | Greene et al. | | 43/42.28 |
| 8,402,687 B1 * | 3/2013 | Jarrell | | 43/42.28 |
| 8,533,990 B2 * | 9/2013 | Aanenson et al. | | 43/42.28 |
| 2001/0047609 A1 | 12/2001 | Orgeron | | |
| 2002/0073607 A1 * | 6/2002 | Hickok et al. | | 43/42.28 |
| 2003/0163945 A1 | 9/2003 | Okada | | |
| 2005/0150151 A1 | 7/2005 | Wiskur | | |
| 2005/0155273 A1 | 7/2005 | Phipps | | |
| 2006/0032109 A1 * | 2/2006 | Chiodo | | 43/42.09 |
| 2006/0042147 A1 * | 3/2006 | Jenkins | | 43/42.09 |
| 2006/0123689 A1 * | 6/2006 | Lange | | 43/42.32 |
| 2006/0265936 A1 | 11/2006 | Wilkinson | | |
| 2007/0214709 A1 | 9/2007 | Shelton | | |
| 2007/0234633 A1 | 10/2007 | Uselman et al. | | |
| 2008/0066368 A1 | 3/2008 | Ciotlos | | |
| 2008/0104878 A1 | 5/2008 | Woller | | |
| 2008/0163539 A1 | 7/2008 | Choi | | |
| 2008/0202016 A1 | 8/2008 | Robertson | | |
| 2008/0295385 A1 | 12/2008 | Shelton | | |
| 2009/0113783 A1 | 5/2009 | Hollomon | | |
| 2009/0126256 A1 * | 5/2009 | Gregory | | 43/42.09 |
| 2009/0172993 A1 | 7/2009 | Willis | | |
| 2009/0183418 A1 | 7/2009 | Dahlberg | | |
| 2010/0000145 A1 | 1/2010 | Leppala | | |
| 2010/0107469 A1 | 5/2010 | Dunkerley | | |
| 2010/0218413 A1 | 9/2010 | Simmons | | |
| 2010/0229454 A1 | 9/2010 | Cunningham | | |
| 2010/0236130 A1 | 9/2010 | Basso | | |
| 2010/0251595 A1 | 10/2010 | Leung | | |
| 2011/0185622 A1 * | 8/2011 | Somogyi | | 43/42.06 |

* cited by examiner

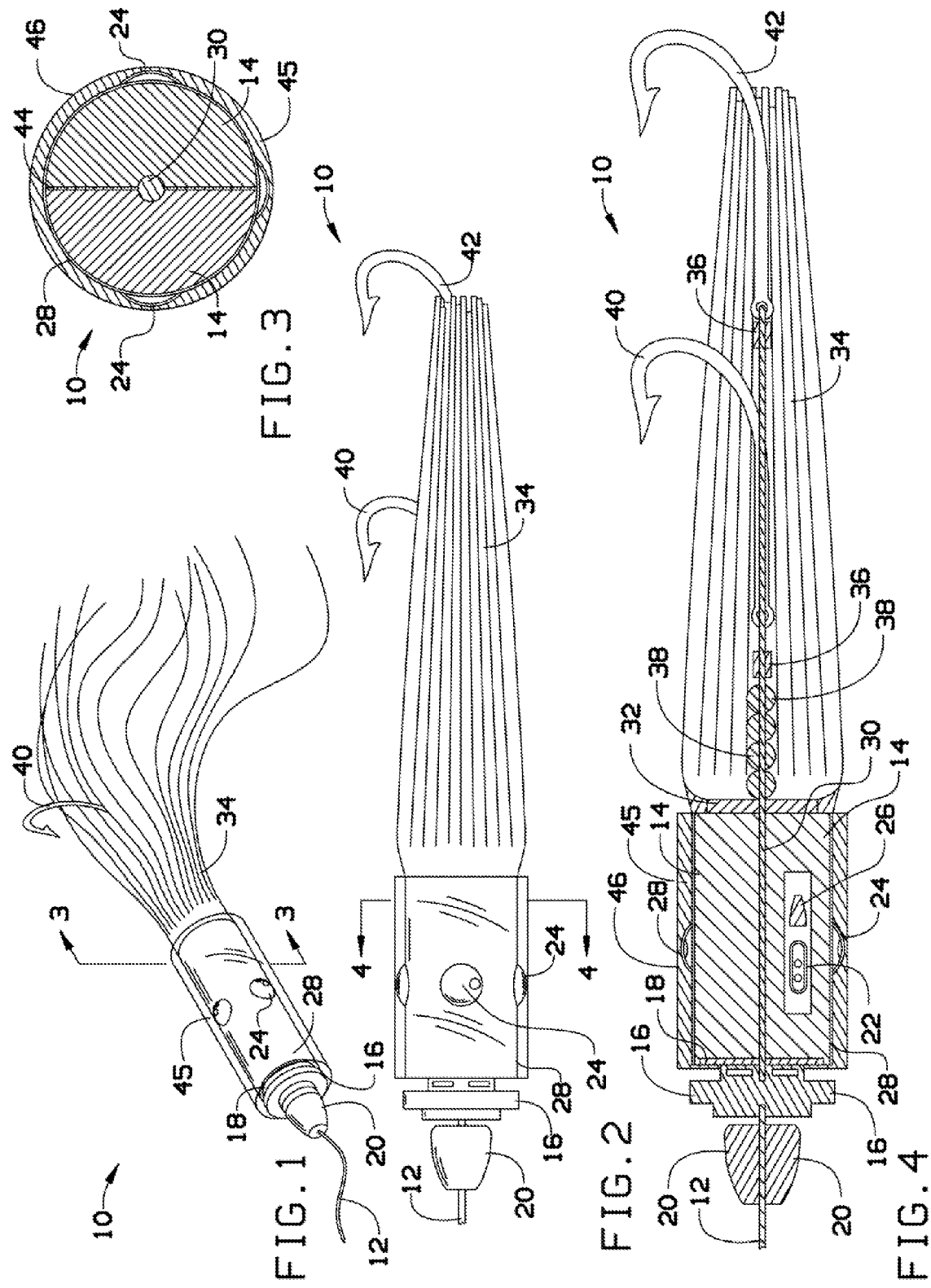

FISHING LURE WITH MOVABLE PARTS

CROSS-REFERENCE TO RELATED APPLICATIONS

This application claims priority to provisional application 61/386,686 filed Sep. 27, 2010.

BACKGROUND OF THE INVENTION

The present invention generally relates to fishing lures, and more particularly to fishing lures with movable parts.

Current fishing lures may create few or no bubbles and may be without keel weighting for stability.

As can be seen, there exists a need for a fishing lure with movable parts that may be used to catch a plurality of species of fish.

SUMMARY OF THE INVENTION

In one aspect of the present invention, a fishing lure comprises a lure head; a leader within a leader tube within the lure head; a ball rattler within the lure head; and an aerator cap attached to a front side of the lure head, wherein the aerator cap contains vented slots within the aerator cap.

In another aspect of the present invention, a fishing lure comprises two half lure head bodies secured into a lure head; a leader within a leader tube centered within the lure head; a ball rattler within the lure head; and an aerator cap attached to a front side of the lure head, wherein the aerator cap contains vented slots within the aerator cap.

These and other features, aspects and advantages of the present invention will become better understood with reference to the following drawings, description and claims.

BRIEF DESCRIPTION OF THE DRAWINGS

FIG. 1 shows a perspective view of a fishing lure according to an exemplary embodiment of the invention;

FIG. 2 shows a side view of the fishing lure of FIG. 1;

FIG. 3 shows a front section view taken along line 3-3 of FIG. 1; and

FIG. 4 shows a side section view taken along line 4-4 of FIG. 1.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provides a fishing lure that creates both high and low frequency sound and creates bubbles.

Referring to FIGS. 1-4, a fishing lure head 10 may include a leader 12, a brass, noise sensitive weight 20, an aerator cap 16, an inlaid chrome foil 18, a moving eye 24, and foil wrap 28 surrounding the lure head 10. The fishing lure head 10 may include design resin casting elements 45 with an outer body surface 46, a lure skirt 34, and hooks 40, 42. In an exemplary embodiment, the fishing lure may include a glass ball rattler 22 and a weight 26, which may be, for example, a 1/16 ounce (oz.) weight. In an exemplary embodiment, the weight may be located in the keel of the lure.

In an exemplary embodiment, lure head half bodies 14 may be combined together as one piece with double sided waterproof adhesive foam tape 44. The lure head 10 may be wrapped in an adhesive scale designed foil wrap 28, which may be, for example, metallic colored scale effect adhesive foil in assorted colors. An eye, such as, for example, a plastic doll eye 24, may be attached to each side of the lure head 10. The number of doll eyes 24 or placement may be varied.

An aerator cap 16 may have vented slots in a circular pattern which may allow passage of liquid, such as water, to produce bubbles. A weight 20 such as, for example, a half ounce brass noise sensitive weight 20 may be shaped, for example, as a bullet. The weight 20 may be of various weights. A round glass bead (not shown) inside the brass noise sensitive weight may produce sound. A lure collar 32 may be in a circular configuration with varied length and may attach the skirt 34 to the lure head 10. A hole, such as, for example, a 5/32 hole, may be drilled through the center, or off of the center, of the lure head 10, depending on the balance and positioning of a leader tube 30. The leader tube 30 may be inserted into the hole. The lure collar 32 may be attached to the lure head 10. Beads 38, for example four beads, may be attached to a leader 12. The beads 38 may be multi-colored, plastic, and circular, or may take other various shapes. The skirt 34 may be multi-colored, or various single colors, and be made of, for example, silicone rubber, of varied length. For example, the skirt 34 may be between 8 inches and 16 inches in length, horizontal cut, with strands varying from 12 to 24 per skirt 34. The skirt may, for example, be made from plastic, cloth, feathers, foils, soft textiles, or synthetic material. A sleeve 36 may secure a leader 12, a knot on a hook 42, or a barrel swivel. The sleeve 36 may be used in tying the knot on the hook 42.

In an exemplary embodiment, the lure head 10 may be made of a composite of design resin, a catalyst hardener material. The lure head 10 may, for example, be cast in an elongated circular shape of varied length. As an example, the lure head 10 may be in the shape of an oval, rectangle, or bullet shaped. The lure head 10, for example, may be a composite of two half resin bodies 14. The lure head my include, for example, a 5/32 by 0.1 inch brass leader tube 30, a glass ball rattler 22, a 1/16 ounce lead weight 26, and inlaid chrome foil 18 that may act as a reflective light source. The hooks 40, 42 may range from 6/0 to 9/0 in size, or other varied sizes. The glass ball rattler 22 may include a varied number of balls. The moving eyes 24 may be of varied size and number. The beads 38 may be of varied color and number.

In an exemplary embodiment, the leader tube 30 may protrude one quarter inches forward of the front of the lure head 10. The leader 12 may be resilient and bendable. The aerator cap 16 may be attached to the lure head 10 with a rotatable connection or may be attached to the lure head 10 with a resilient material that binds stress, such as a hard rubber or metal spring. The horizontal position of the leader 12 may be configured to allow a rotation of the brass noise weight 20. In an exemplary embodiment, the leader tube may be one half inch in diameter. The leader 12 may be threaded through the beads 38 such that the beads may rotate around the leader 12. The lure head 10 may include two sleeves 36 that may be separated from each other on either side of a hook 40. The weight 20 may keep the lure head 10 in the water, and may emit a high frequency sound and press against the aerator cap 16, and force water through slots in the aerator cap 16. The distance between the aerator cap 16 and the lure head 10 may be adjustable using a small crimp weight (not shown), to create a wider or narrower pattern of bubbles. The moving eyes 24, glass ball rattler 22, and ¹⁄₁₆ ounce weight 20 may produce noise and movement in the lure head 10 to attract fish. In an exemplary embodiment, the lure head 10 may be put in water and pulled by a power source such as a boat engine at a speed of 5 to 10 knots. The lure head my produce sound, produce a bubble action pattern, produce contrasting metallic colors, and attract fish. In an exemplary embodiment, a two inch lure head may be used with an 8 inch skirt, a three inch lure head 10 may be used with a 12 inch skirt, and a 4 inch lure head may be used with a 14 inch skirt. In an exemplary embodiment, the parts of the lure may be encased as one piece rather than attached as multiple parts.

It should be understood, of course, that the foregoing relates to exemplary embodiments of the invention and that modifications may be made without departing from the spirit and scope of the invention as set forth in the following claims.

What is claimed is:

1. A fishing lure comprising:
   a lure head with front and rear ends, the lure head comprising:
      two half cylinder lure bodies adhered to each other on respective flat surfaces thereof and combined together as one piece;
      a brass leader tube extending through the lure head, the brass leader tube positioned centrally within the lure head and protruding ¼ inch forward of the front end of the lure head;
      a ball rattler located within the lure head in close proximity to the brass leader tube, the ball rattler containing one noise-making ball or a plurality of noise-making balls and capable of producing low-frequency sounds;
      a keel weight located with the lure head so as to be subordinate to said leader tube and slightly toward the rearward end of the lure head, the keel weight for decreasing pitching and rolling of the lure to more closely mimic natural prey movement;
      a lure skirt;
      a lure collar located on the rearward end of the lure head for attachment of the lure skirt;
      a composite of design resin from which the lure head is made, the lure head encapsulating the two half cylinder lure bodies, the brass leader tube, the ball rattler, and the keel weight, the lure head shape can be formed be casting into one of a barrel, oval, rectangular, or bullet shape;
   an aerator cap positioned adjacent the front end of the lure head, wherein the aerator cap contains vented slots in a circular pattern within the aerator cap adapted to allow water to pass and produce bubbles;
   a conically-shaped, noise sensitive brass weight that is positioned adjacent the forward end of the lure head such that the aerator cap is positioned between the conically-shaped brass weight and the lure head, the brass weight making contact with the brass leader tube during use so as to produce high-frequency sounds within the leader tube and vibrations effecting low-frequency sound via agitation of the ball rattler; and
   a leader line running centrally through the brass leader tube, the aerator cap, and the conically-shaped brass weight.

2. The fishing lure of claim 1, including an adhesive, metallic foil wrap surrounding said two half cylinder lure bodies and enclosed within said resin of the lure head, wherein the foil is made of chrome or similarly visually metallic material so as to give an effect of fish scales when receiving light, wherein said wrap can comprise various colors and designs.

3. The fishing lure of claim 1, including a movable eye, movable eyes, or a plurality of eyes adhered to a foil wrap and enclosed within the lure head of composite of design resin.

4. The fishing lure of claim 1, wherein the skirt is attached to the lure collar on the rear end of the lure head, wherein the skirt can be monochromatic or multicolored and of varying lengths.

5. The fishing lure of claim 1, wherein the aerator cap is attached to the leader line such that a position of the aerator cap is adjustable along the leader line with respect to the lure head so as to create a wider or narrower bubble pattern so as to allow for less obscuring of the lure head and skirt.

6. A fishing lure comprising:
   a lure head with front and rear ends, the lure head comprising:
      two half cylinder lure bodies adhered to each other on respective flat surfaces thereof and combined together as one piece;
      a foil wrap surrounding the two half cylinder lure bodies;
      a circular chrome foil inlay extending perpendicular to the lure head and placed on a front face of the one piece;
      at least one movable eye attached to the lure head;
      a brass leader tube extending through the lure head, the brass leader tube positioned centrally within the lure head and protruding ¼ inch forward of the front end of the lure head;
      a ball rattler located within the lure head in close proximity to the brass leader tube, the ball rattler containing one noise-making ball or a plurality of noise-making balls and capable of producing low-frequency sounds;
      a keel weight located with the lure head so as to be subordinate to said leader tube and slightly toward the rearward end of the lure head, the keel weight for decreasing pitching and rolling of the lure to more closely mimic natural prey movement;
      a lure skirt;
      a lure collar located on the rearward end of the lure head for attachment of the lure skirt;
      a composite of design resin from which the lure head is made, the lure head encapsulating the two half cylinder lure bodies, the foil wrap, the foil inlay, the at least one movable eye, the brass leader tube, the ball rattler, and the keel weight;
   an aerator cap positioned adjacent the front end of the lure head, wherein the aerator cap contains vented slots in a circular pattern within the aerator cap adapted to allow water to pass and produce bubbles;
   a conically-shaped, noise sensitive brass weight that is positioned adjacent the forward end of the lure head such that the aerator cap is positioned between the conically-shaped brass weight and the lure head, the brass weight making contact with the brass leader tube during use so as to produce high-frequency sounds within the leader tube and vibrations effecting low-frequency sound via agitation of the ball rattler; and
   a leader line running centrally through the brass leader tube, the aerator cap, and the conically-shaped brass weight, wherein the aerator cap is attached to the leader line such that a position of the aerator cap is adjustable along the leader line with respect to the lure head so as to create a wider or narrower bubble pattern so as to allow for less obscuring of the lure head and skirt.

7. The fishing lure of claim 6, wherein the ball rattler is made of glass and receives vibrations from the striking of the noise sensitive brass weight and the brass leader tube thereby creating an increase in the agitation of the one ball or the plurality of balls and high frequency noises.

8. The fishing lure of claim 6, wherein the at least one movable eyes comprises one, two or a plurality of movable eyes which are adhered to said foil wrap surrounding the two half cylinder lure bodies of the lure head, wherein each movable eye is encased within the composite of design resin and resides interiorly within the lure head.

9. The fishing lure of claim 6, including:
- a plurality of beads attached to a portion of the leader exiting the rear end of the lure head to provide enhanced visual and sound recognition by predator fish;
- a sleeve secured on the leader line rearward of the plurality of beads; and
- a hook secured to the leader.

10. The fishing lure of claim 6, wherein the conically-shaped, noise sensitive brass weight can be configured to be of various sizes, and wherein said weight serves the auditory functions of creating high frequency sounds through the striking of the brass leader tube and low frequency sound via promulgation of vibrations along the leader tube that agitate the ball rattler thus enhancing sound production.

11. The fishing lure of claim 6, wherein the skirt is monochromatic or multi-colored and comprises various lengths from 8 to 16 inches and is made of plastic, cloth, feathers, foils, soft textiles, or synthetic material.

12. The fishing lure of claim 6, wherein the composite design resin can comprise varied lengths and thicknesses that can be constructed in an oval, barrel, rectangular, or bullet shape.

13. The fishing lure of claim 6, wherein the foil wrap and foil inlay reflect light.

14. The fishing lure of claim 6, wherein the brass leader tube traverses a length of the lure head centrally and is capable of accepting air bubbles forwardly therefrom and releasing air bubbles rearwardly therefrom beneath said lure skirt as a compliment to an exteriorly propagated bubble pattern of said aerator cap.

* * * * *